(12) United States Patent
Bourgeois

(10) Patent No.: US 10,582,805 B1
(45) Date of Patent: *Mar. 10, 2020

(54) OUTDOOR FRYING APPARATUS

(71) Applicant: METAL FUSION, INC., Jefferson, LA (US)

(72) Inventor: Norman Bourgeois, Jefferson, LA (US)

(73) Assignee: Metal Fusion, Inc., Jefferson, LA (US)

( * ) Notice: Subject to any disclaimer, the term of this patent is extended or adjusted under 35 U.S.C. 154(b) by 569 days.

This patent is subject to a terminal disclaimer.

(21) Appl. No.: 14/739,828

(22) Filed: Jun. 15, 2015

Related U.S. Application Data

(63) Continuation of application No. 13/100,411, filed on May 4, 2011, now Pat. No. 9,055,839.

(60) Provisional application No. 61/331,061, filed on May 4, 2010.

(51) Int. Cl.
*A47J 37/12* (2006.01)

(52) U.S. Cl.
CPC ................... *A47J 37/1247* (2013.01)

(58) Field of Classification Search
CPC ......... A47J 37/1247; A47J 36/20; A47J 36/38
USPC .... 126/40, 30, 37 R, 38, 211, 218, 25 R, 51,
126/332, 1 R, 391, 9 R, 376.1, 343.5 A,
126/357, 390, 92 AC, 373, 376, 387,
126/391.1, 390.1, 374.1, 373.1, 91 A,
126/91 R, 343.5 R, 344, 357.1, 369,
126/375.1, 378.1, 39 J, 392.1, 41 R, 265,
126/275 R, 276, 33, 347, 383.1, 385.1,
126/388.1, 39 G, 49, 50, 387.1; 99/340,
99/482, 330, 324, 336, 339, 403–418,
99/426, 345–347, 481, 357, 331, 447,
99/DIG. 11, 327, 337, 355, 375, 424;
426/520–523, 438, 233, 509; 219/441,
219/400, 438, 476, 483; 392/308, 441,
392/444

See application file for complete search history.

(56) References Cited

U.S. PATENT DOCUMENTS

| | | | | |
|---|---|---|---|---|
| 2,128,738 A | * | 8/1938 | Blake | A47J 37/1209 219/434 |
| 2,338,964 A | * | 1/1944 | Pappas | A47J 37/1242 126/373.1 |
| 2,528,776 A | * | 11/1950 | Pappas | A47J 36/38 99/411 |

(Continued)

*Primary Examiner* — Dana Ross
*Assistant Examiner* — Ket D Dang
(74) *Attorney, Agent, or Firm* — Roy Kiesel Ford Doody & North; Brett A. North

(57) ABSTRACT

An outdoor food frying apparatus provides a frame that includes a cabinet having an open top and a open bottom. The frame can be in the form of a plurality of cabinet walls supportive upon a plurality of legs. A burner element is supported upon the frame and within the cabinet interior. The burner element includes a pair of spaced apart burner sections. The pot has a v-shaped bottom comprised of a pair of panels that intercept to form a obtuse angle. One of the burner sections directs a flame against one of the bottom panels, the other of the burner sections directing a flame against the other of the bottom panels. A slot on the cabinet extends to the open top, the valve traveling in the slot when the pot is placed upon the frame in a cooking position. A plurality of baskets are provided that selectively fit the pot interior including one basket that substantially fills the cabinet interior and a second basket that is much smaller than the first basket.

26 Claims, 12 Drawing Sheets

(56) References Cited

U.S. PATENT DOCUMENTS

| | | | | |
|---|---|---|---|---|
| 2,899,889 | A | * | 8/1959 | Wilson .................... A47J 37/12 |
| | | | | 126/345 |
| 4,334,462 | A | | 6/1982 | Hefling |
| 4,420,006 | A | | 12/1983 | Moore et al. |
| 4,623,544 | A | | 11/1986 | Highnote |
| 4,848,318 | A | * | 7/1989 | Brewer ............... A47J 37/1247 |
| | | | | 126/343.5 R |
| 5,209,218 | A | | 5/1993 | Daneshvar et al. |
| 5,355,776 | A | * | 10/1994 | Driskill ................ A47J 37/129 |
| | | | | 99/330 |
| 5,396,832 | A | * | 3/1995 | Simon ................ A47J 37/1271 |
| | | | | 99/337 |
| 5,398,668 | A | | 3/1995 | Daneshvar et al. |
| 5,544,567 | A | * | 8/1996 | Davis ...................... A47J 27/62 |
| | | | | 99/336 |
| 5,577,438 | A | | 11/1996 | Amitrano et al. |
| 5,632,266 | A | | 5/1997 | Sato |
| 5,642,660 | A | | 7/1997 | Killgore et al. |
| 5,979,303 | A | * | 11/1999 | Kobayashi ............ A47J 37/129 |
| | | | | 126/387.1 |
| 6,698,335 | B1 | * | 3/2004 | Bourgeois ............... A47J 27/04 |
| | | | | 126/30 |
| 7,707,929 | B1 | * | 5/2010 | Bourgeois ............... A47J 43/18 |
| | | | | 99/340 |
| 9,055,839 | B1 | * | 6/2015 | Bourgeois ............... A47J 37/12 |
| 2003/0126994 | A1 | * | 7/2003 | Ponting ............... A47J 37/1242 |
| | | | | 99/330 |
| 2008/0110349 | A1 | * | 5/2008 | Mathey ............... A47J 37/1219 |
| | | | | 99/407 |

\* cited by examiner

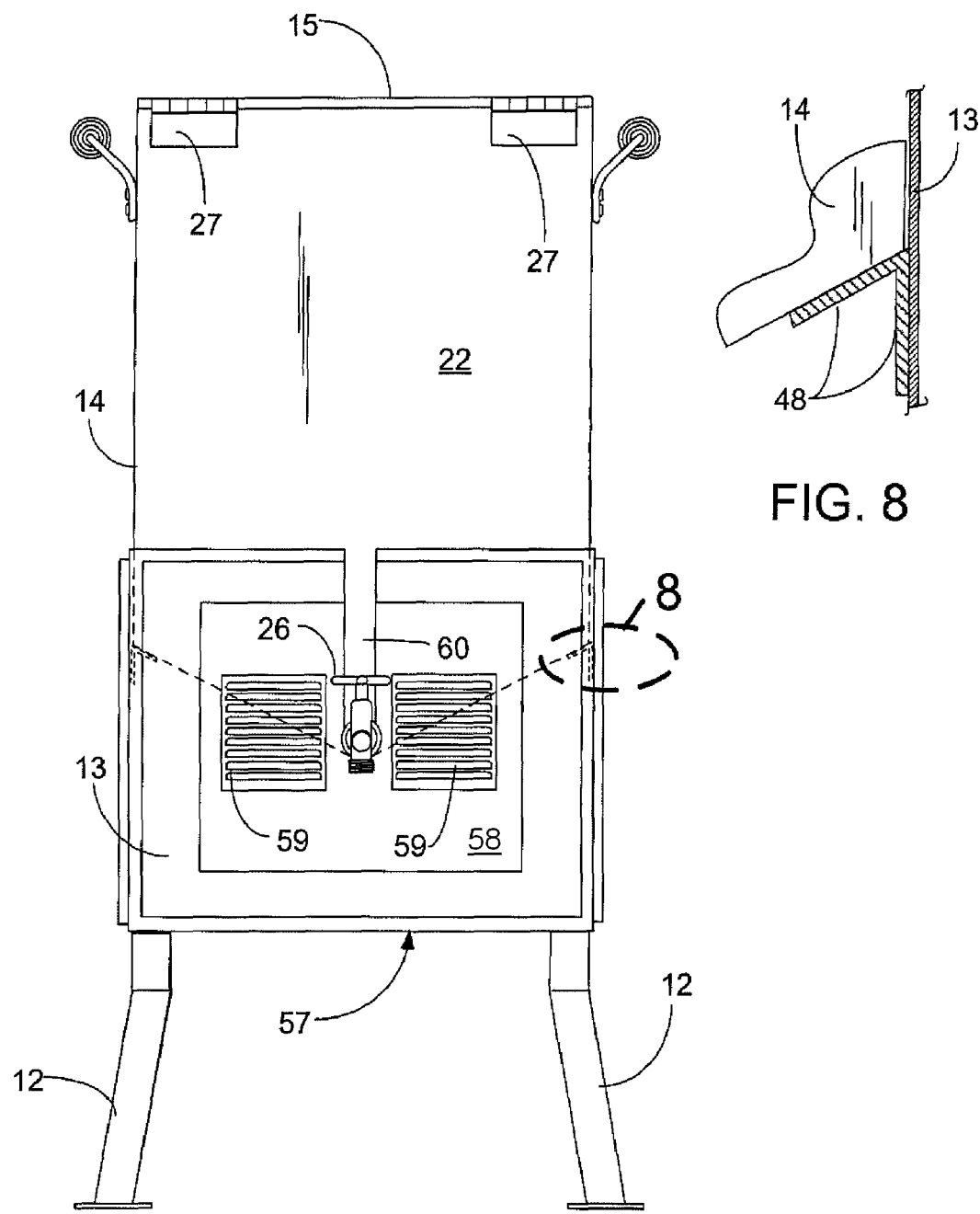
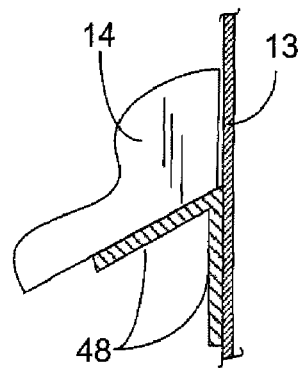
FIG. 8
FIG. 7

OUTDOOR FRYING APPARATUS

CROSS-REFERENCE TO RELATED APPLICATIONS

This is a continuation of U.S. patent application Ser. No. 13/100,411, filed on May 4, 2011 (issued as U.S. Pat. No. 9,055,839 on Jun. 16, 2015), which claims the benefit of U.S. Provisional Patent Application Ser. No. 61/331,061, filed on May 4, 2010.

Priority of U.S. patent application Ser. No. 13/100,411 filed on May 4, 2011 and U.S. Provisional Patent Application Ser. No. 61/331,061, filed May 4, 2010, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to gaseous fueled fired outdoor frying devices such as deep fat fryers. More particularly, the present invention relates to an improved outdoor frying apparatus having a specially configured frame that supports a specially configured pot and a basket or baskets that fit the pot interior and wherein specially configured burner arrangement transfers heat to the pot bottom.

2. General Background of the Invention

Many food frying devices have been patented. Examples can be found in the following table.

The following U.S. Patents are incorporated herein by reference:

| PAT. NO. | TITLE | ISSUE DATE |
| --- | --- | --- |
| 4,420,006 | Spray Cleaning System for Frying Apparatus | Dec. 13, 1983 |
| 4,623,544 | Constant Temperature Fryer/Cooker Assembly | Nov. 18, 1986 |
| 5,209,218 | Deep Frying Apparatus | May 11, 1993 |
| 5,398,668 | Deep Frying Apparatus | Mar. 21, 1995 |
| 5,577,438 | Gas Fired Deep Fat Fryer | Nov. 26, 1996 |
| 5,642,660 | Gas Fired Deep Fat Fryer | Jul. 1, 1997 |

BRIEF SUMMARY OF THE INVENTION

The present invention provides a food frying apparatus for use in an outdoor setting. The apparatus includes a frame which includes a cabinet having an open top and an open bottom and a plurality of side walls. A burner element is supported upon the frame within the cabinet, the burner element being positioned below the opened top.

The burner element includes a pair of spaced apart burner sections. These burner sections can be generally parallel to one another.

A pot removably fits the cabinet interior, resting upon a pot support in a cooking position.

In one embodiment, the pot provides a tapered or V-shaped bottom. The bottom can be comprised of a pair of panels that intersect to form an angle, such as an obtuse or right angle. The pot also includes a plurality of pot side walls that extend upwardly from the bottom panels.

One of the burner sections directs the flame against one of the bottom panels. The other of the burner sections directs a flame against the other of the bottom panels. The pot can provide a drain opening. The drain opening can be fitted with a valve for enabling selective draining of the contents of the pot.

In one embodiment, a slot on the cabinet extends to the open top, the valve traveling in the slot when the pot is placed upon the frame in a cooking position.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 7 is a fragmentary rear elevation view of a preferred embodiment of the apparatus of the present invention;

FIG. 8 is a fragmentary view illustrating the pot support portion of the apparatus of the present invention;

DETAILED DESCRIPTION OF THE INVENTION

Figure 1:
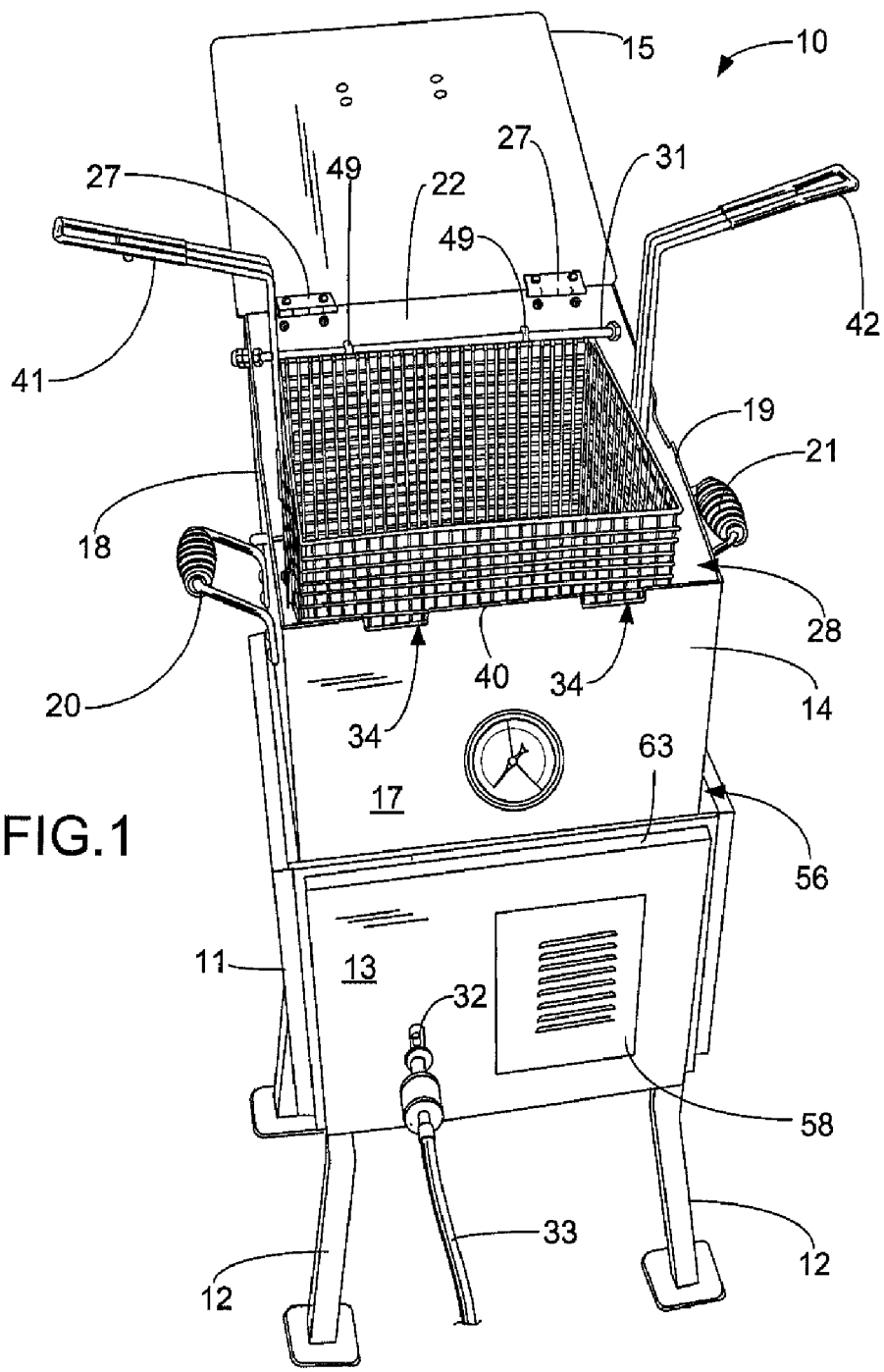
FIG. 1 is a front perspective view of a preferred embodiment of the apparatus of the present invention.
Figure 2:
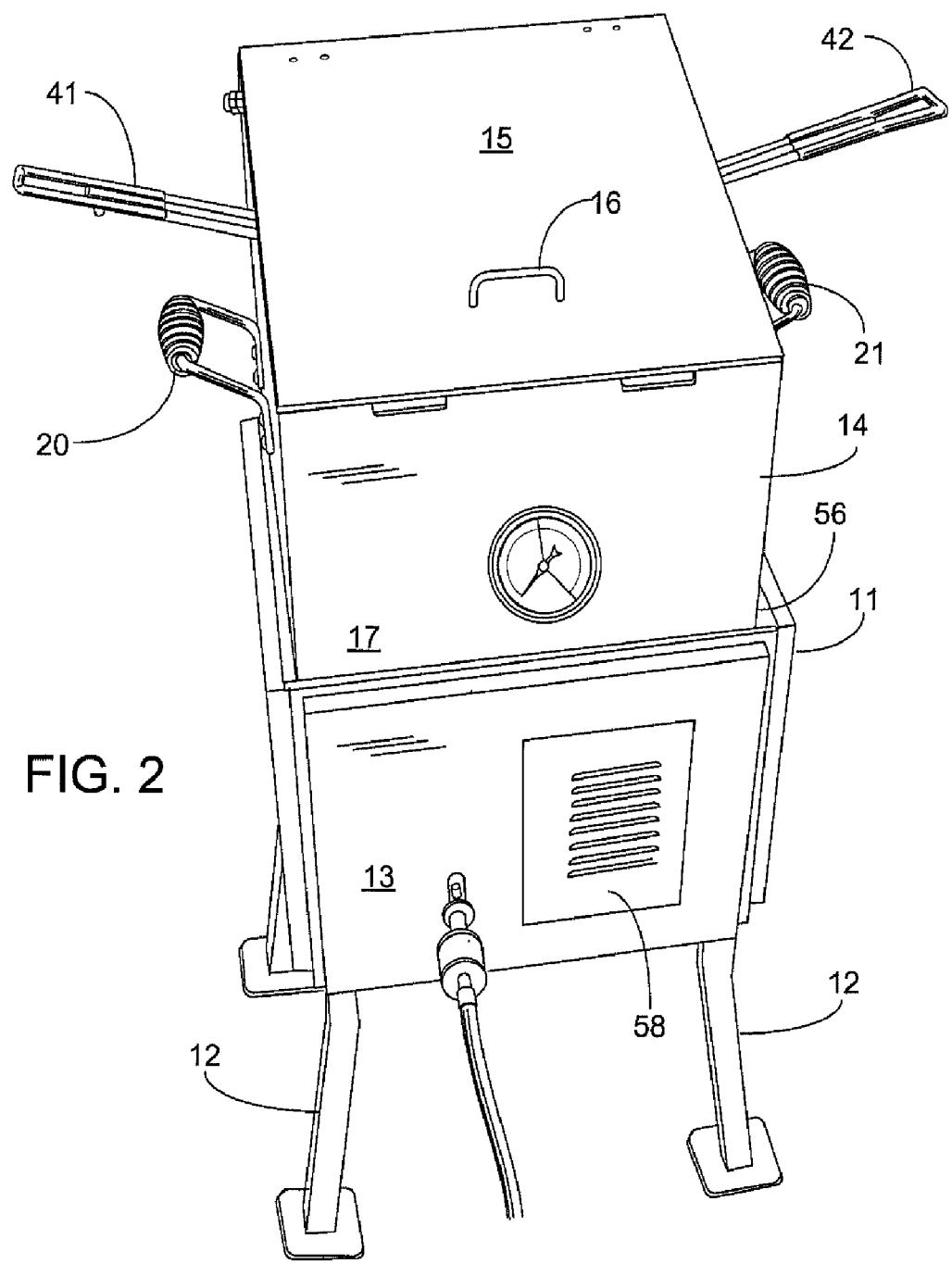
FIG. 2 is a perspective view of a preferred embodiment of the apparatus of the present invention.
Figure 3:
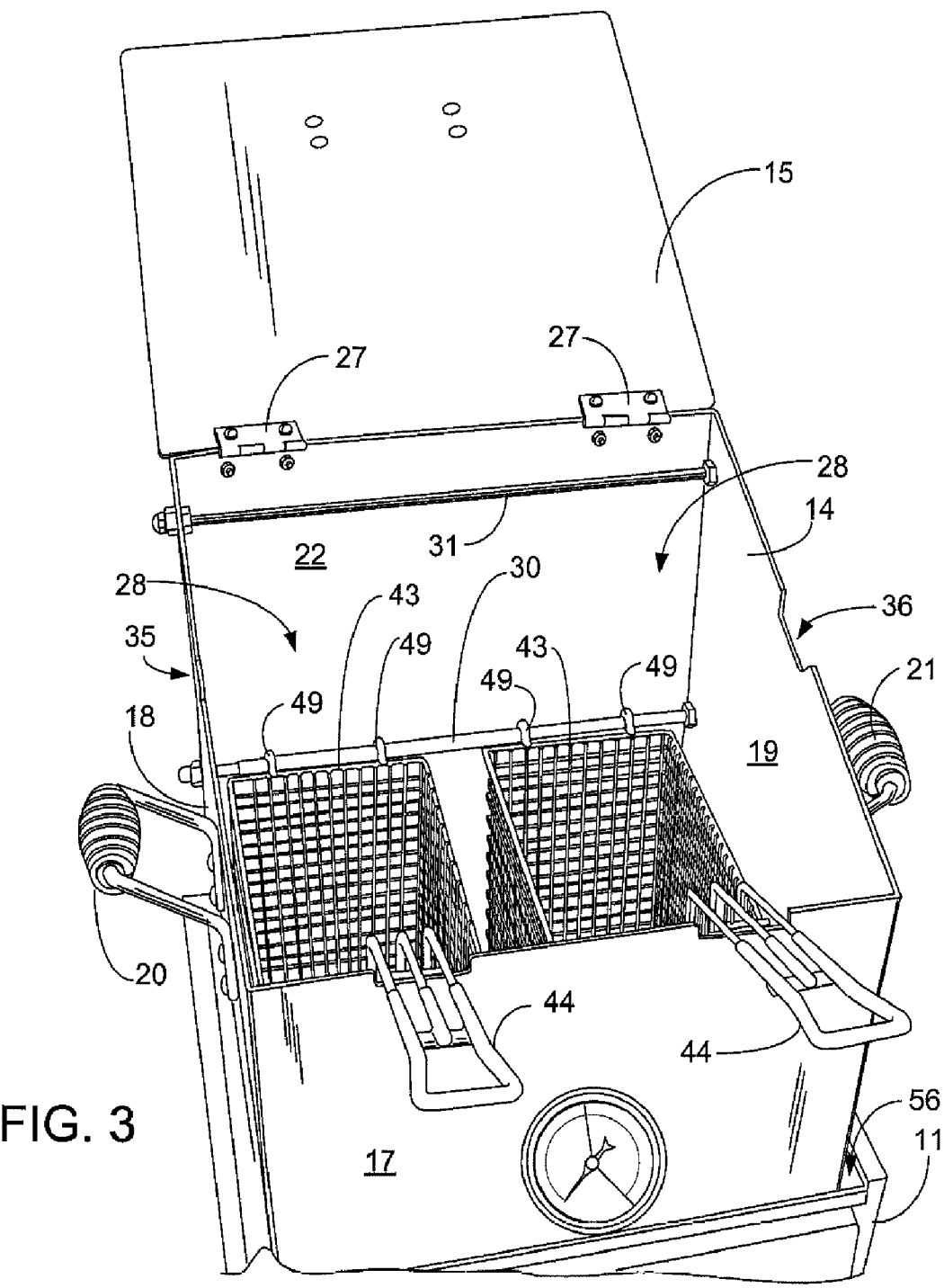
FIG. 3 is a fragmentary view of a preferred embodiment of the apparatus of the present invention.
Figure 4:
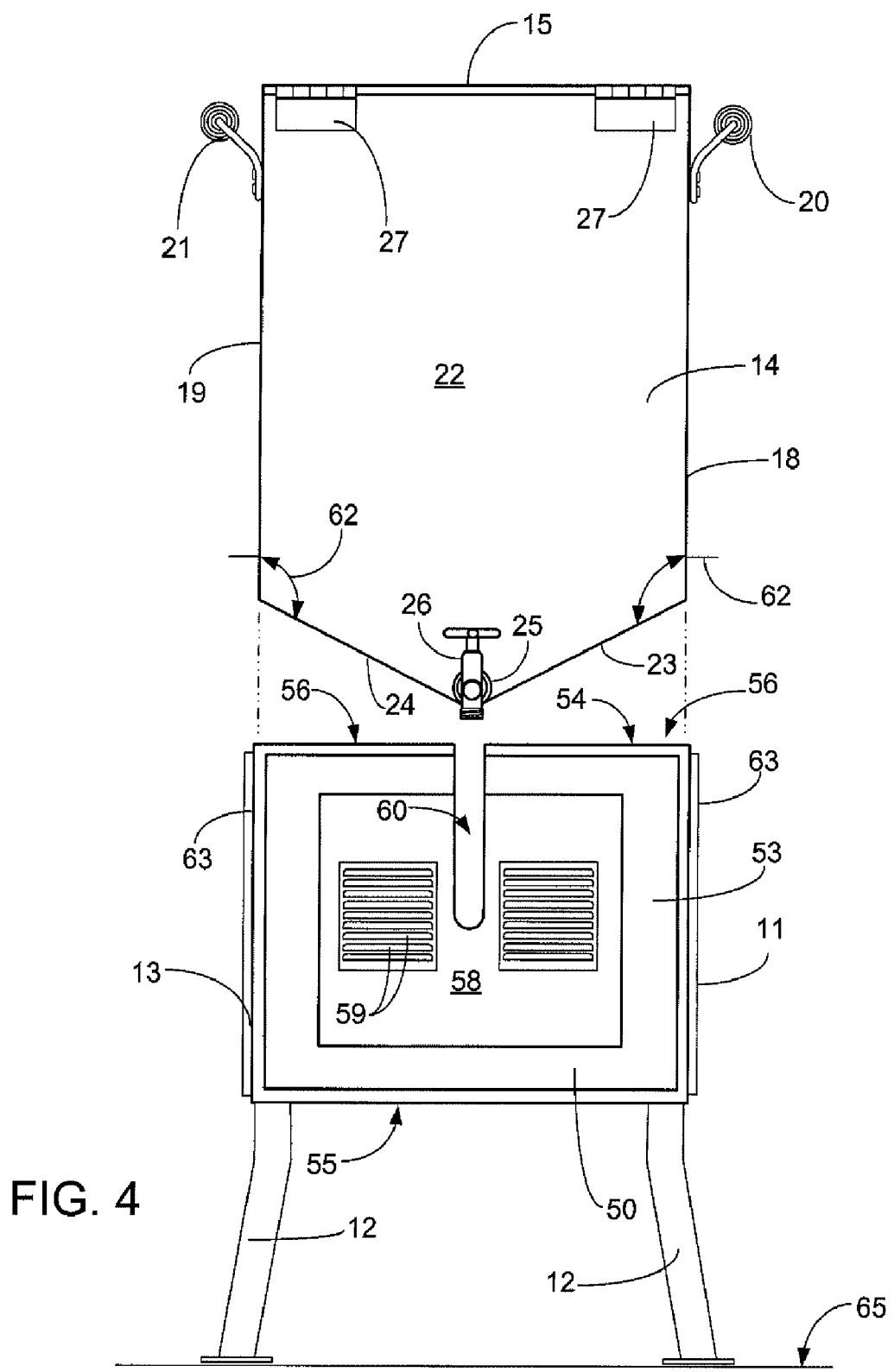
FIG. 4 is a rear elevation view of a preferred embodiment of the apparatus of the present invention.

FIGS. 1-11 show a preferred embodiment of the apparatus of the present invention designated generally by the numeral 10. Outdoor frying apparatus 10 provides a frame 11. The frame 11 can be somewhat elevated, supported on a plurality of legs 12. An upper end portion of the frame provides a cabinet 13 that is receptive of pot 14.

Figure 5:
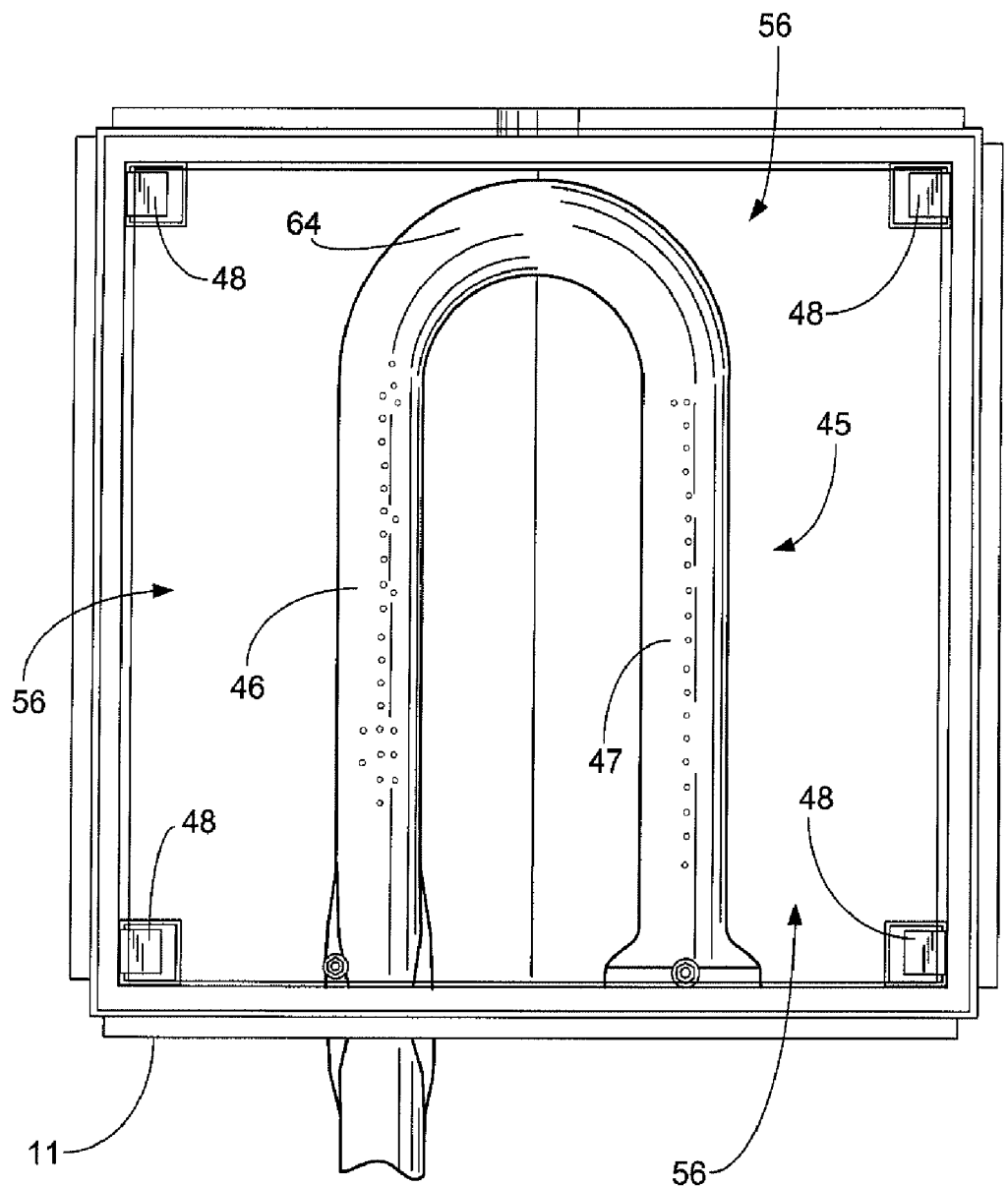
FIG. 5 is a fragmentary top view of a preferred embodiment of the apparatus of the present invention.
Figure 6:
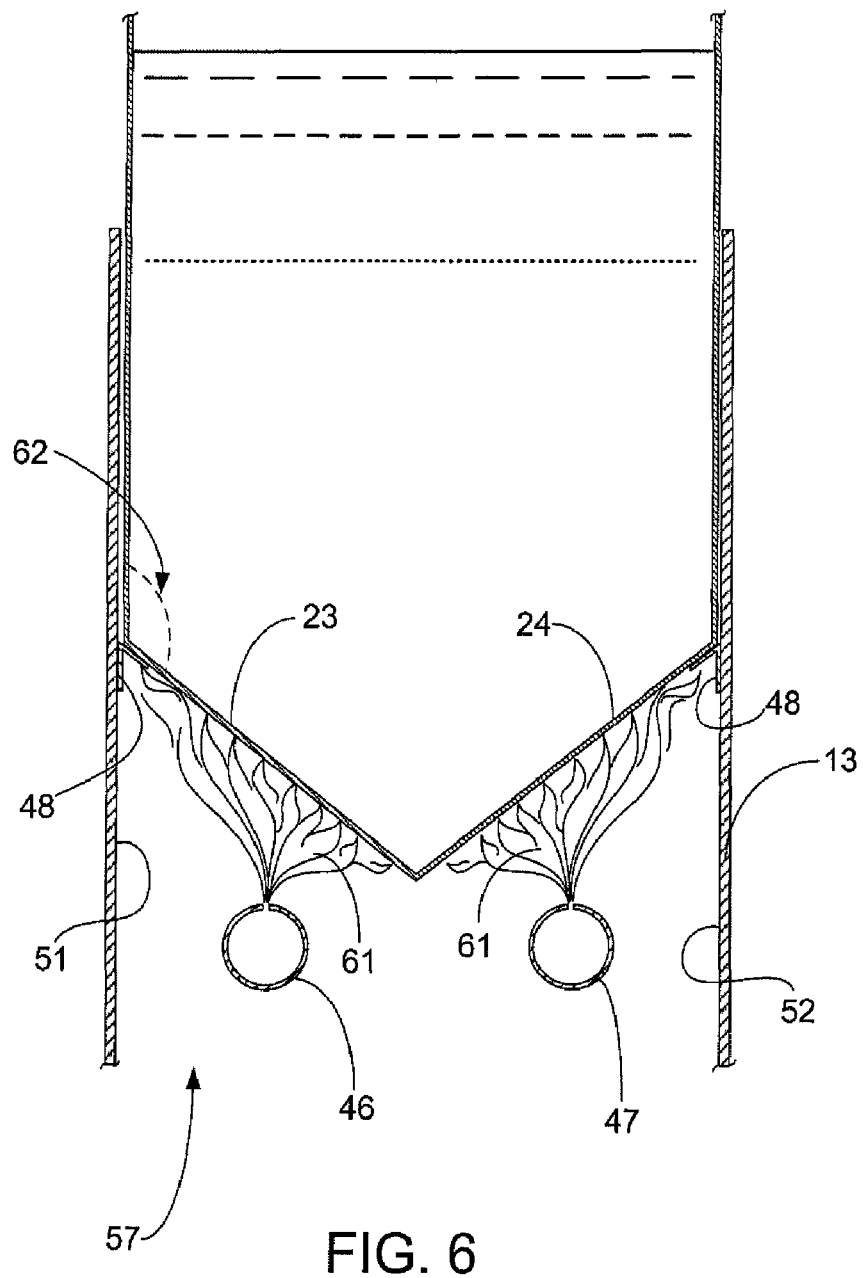
FIG. 6 is a fragmentary elevation view of a preferred embodiment of the apparatus of the present invention.
Figure 9:
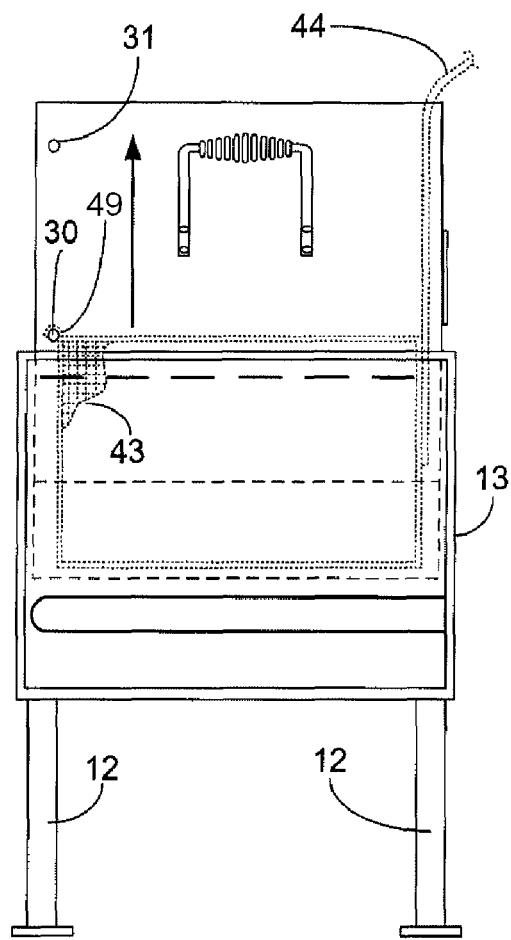
FIG. 9 is a side elevation view of a preferred embodiment of the apparatus of the present invention.
Figure 10:
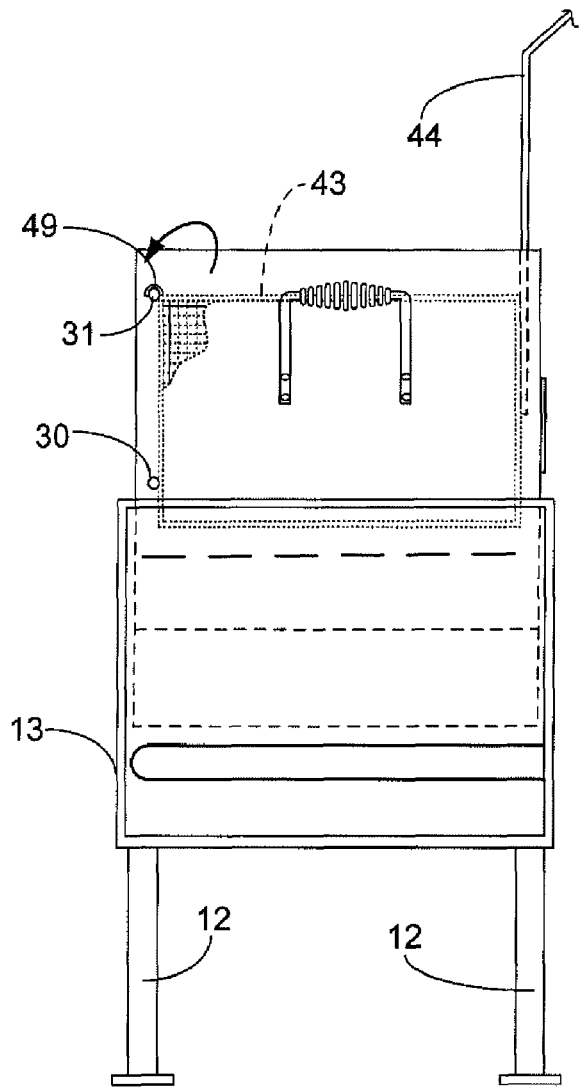
FIG. 10 is a side elevation view of a preferred embodiment of the apparatus of the present invention.
Figure 11:
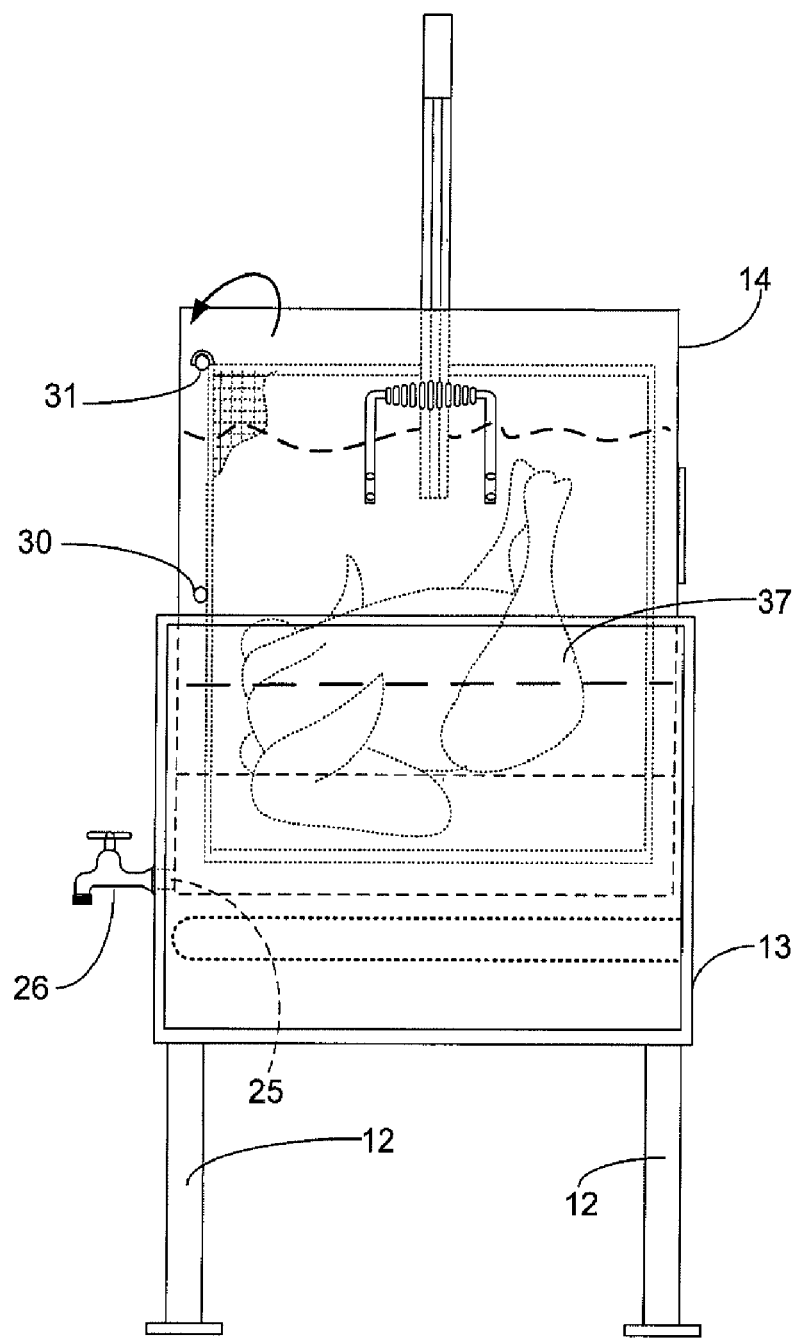
FIG. 11 is a side elevation view of a preferred embodiment of the apparatus of the present invention.
Figures 12, 13:
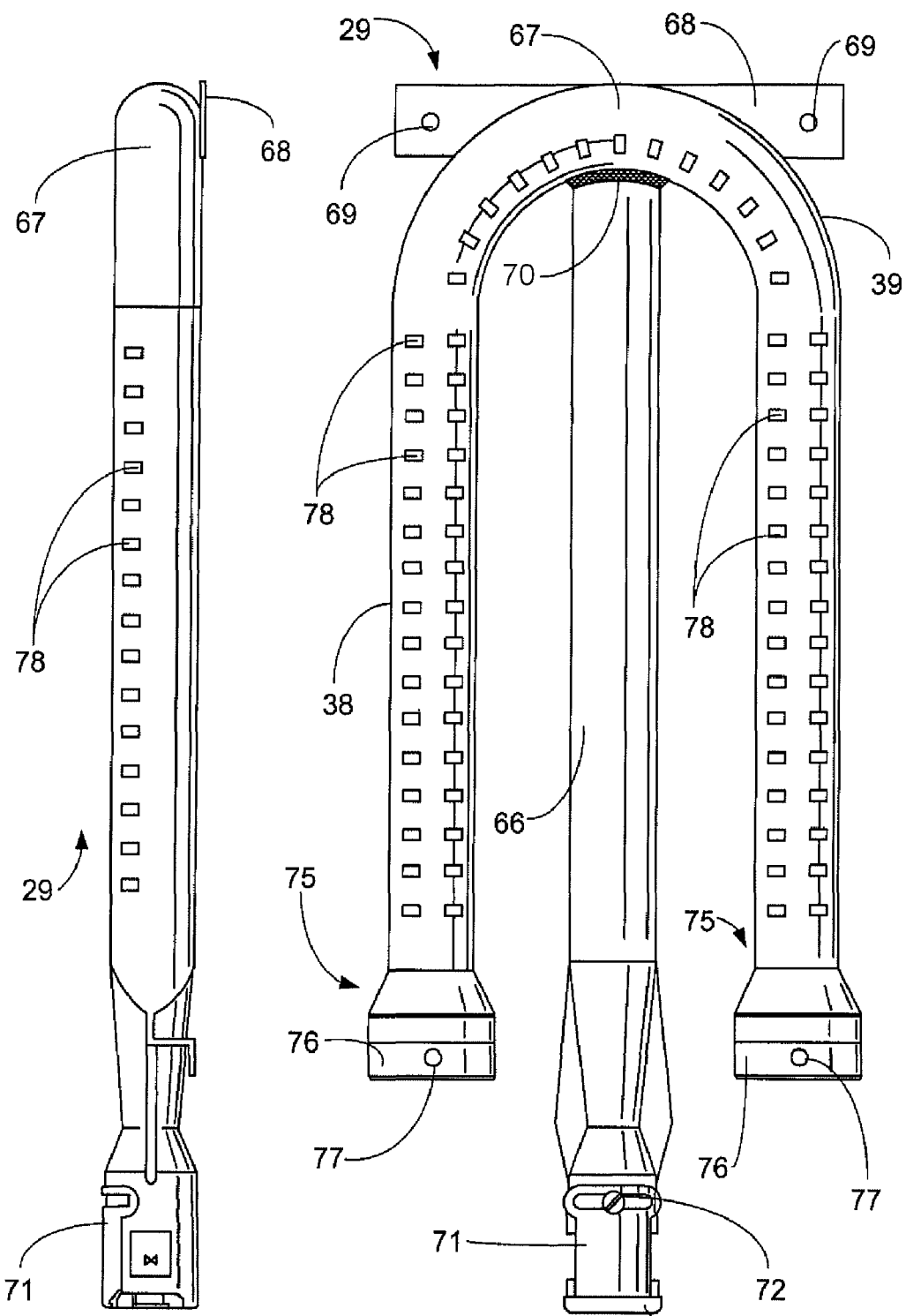
FIG. 12 is a top fragmentary view of a preferred embodiment of the apparatus of the present invention showing an alternate burner arrangement.
FIG. 13 is a side fragmentary view of a preferred embodiment of the apparatus of the present invention showing an alternate burner arrangement.
Figure 14:
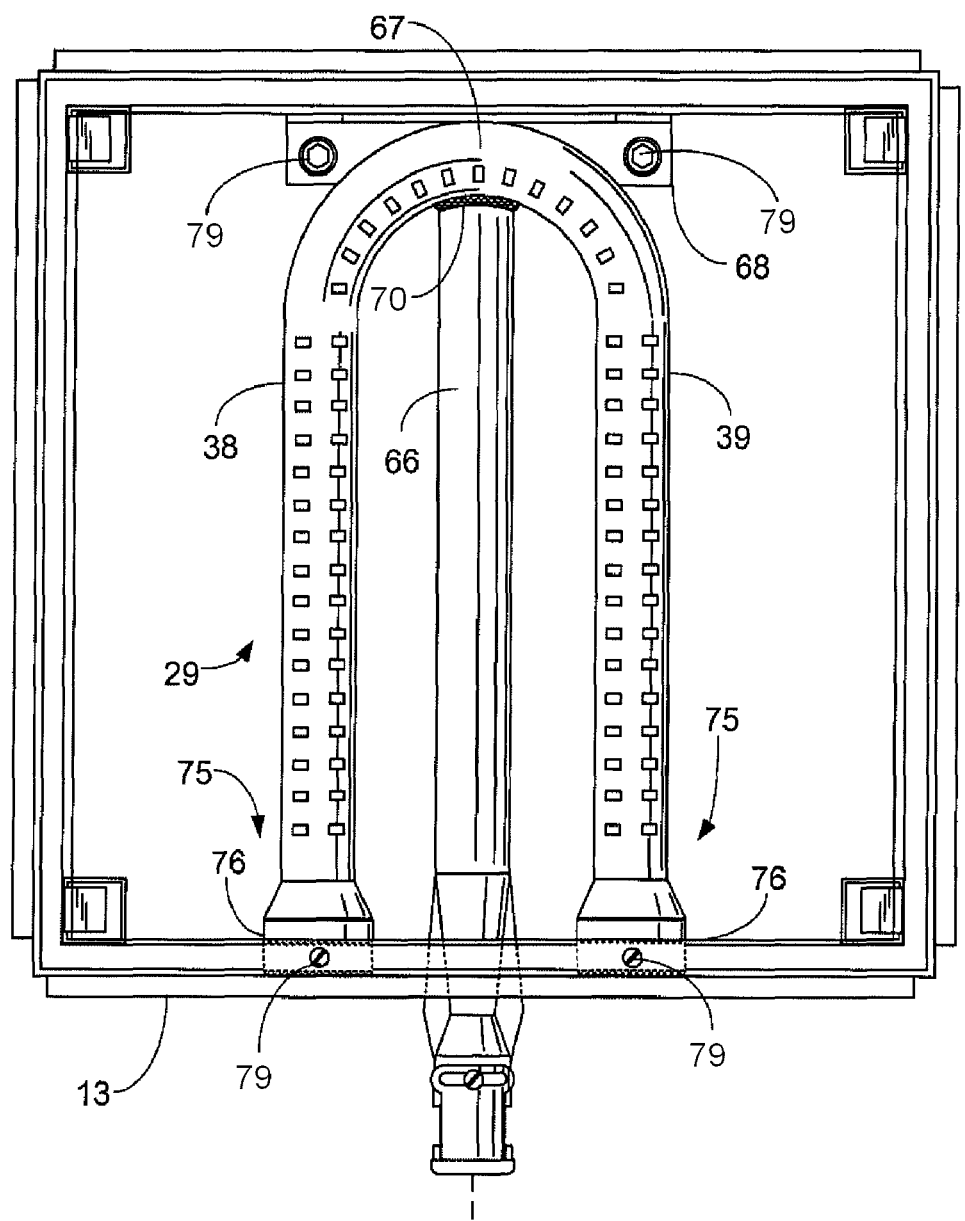
FIG. 14 is a top fragmentary view of a preferred embodiment of the apparatus of the present invention showing an alternate burner arrangement.
Figure 15:
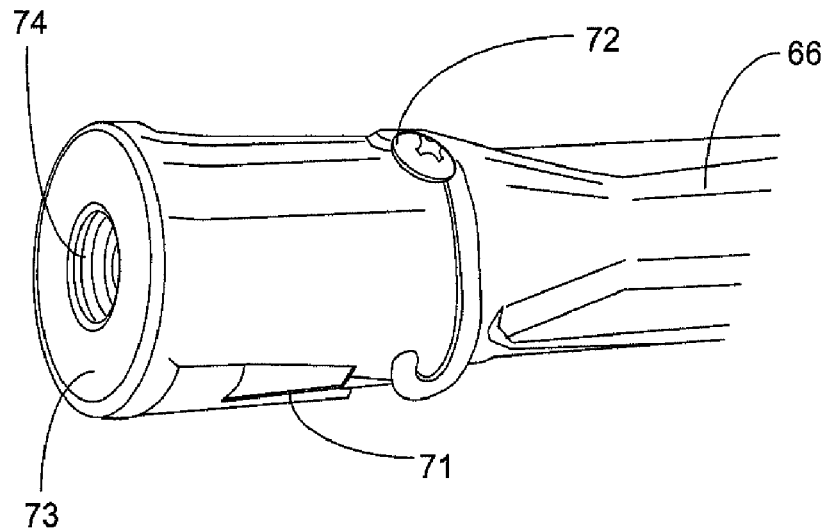
FIG. 15 is a perspective fragmentary view of a preferred embodiment of the apparatus of the present invention showing an alternate burner arrangement.
Figure 16:
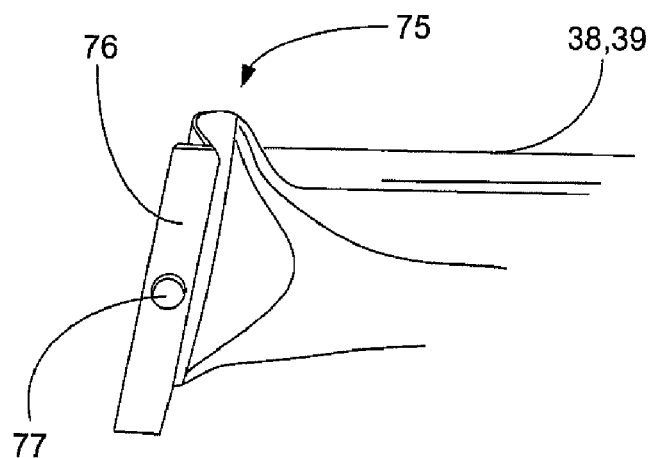
FIG. 16 is a perspective fragmentary view of a preferred embodiment of the apparatus of the present invention showing an alternate burner arrangement.

Pot 14 is specially configured to receive heat transfer or flame 61 from burner 45. The burner 45 provides first and second generally parallel burner elements 46, 47 as shown in FIGS. 5-6. Elements 46, 47 can be connected with elbow (e. g., 180° elbow) or bend section 64.

In FIGS. 1-4, pot 14 has a lid 15 that pivotally attaches to rear panel 22. Lid 15 can be moved between open and closed positions using handle 16. The rear panel 22 is joined to a pair of side panels 18, 19. The side panels 18, 19 are joined to front panel 17. A pair of bottom panels 23, 24 are provided, each panel 23, 24 being inclined so that each of the bottom panels 23, 24 forms an obtuse angle 62 with a pot side wall 18 or 19 as shown in FIG. 6. The pot 14 can be lifted from the frame 11 using handles 20, 21.

The frame 11 provides a plurality of supports 48 (see FIG. 6) that engages the bottom panels 23, 24 of the pot 14, holding pot 14 lid 15 at a elevation of about thirty and thirty-six inches (30"-36") above an underlying support surface 65 (e.g. concrete slab). The outdoor frying apparatus 10 of the present invention is designed to be partially filled with a cooking oil such as peanut oil or the like. When cooking is completed and the cooking medium (e.g., peanut oil) has cooled, a drain outlet opening 25 enables the oil to be drained through valve 26 and into a selected container for reuse. After cooking is completed, a lid 15 can be moved to a closed position by rotating the lid about hinges 27. The lid 15 enables the pot interior 28 to be covered after cooking is completed and prevent the falling of any debris such as leaves into the pot 14 interior 28.

Pot 14 can be provided with a stop that limits the degree of opening of lid 15. The pot 14 interior 28 is provided with a pair of spaced apart rods 30, 31 that extend transversely from one side panel 18 to the other side panel 19 (see FIG. 3). These rods 30, 31 include a lower rod 30 and a upper rod 31. Each rod 30, 31 is receptive of a smaller basket 43 (or pair of baskets 43), each having a handle 44. The basket 43 has a hanger 49 such as a pair of hooks that enables the pot to be supported by the rod 30 or 31 in a selected position (see FIGS. 3 and 9-10). The lower rod 30 enables the basket 43 to be supported in a lower position, such as during frying of food (see FIGS. 3 and 9). The upper rod 31 enables the basket 43 to be positioned in an elevated position, such as after cooking and wherein food contained within the basket 43 is draining of excess oil (see FIG. 10).

Cabinet 13 provides an opening 32 for fuel line 33. The fuel line 33 supplies fuel to the burner 45 and burner elements 46, 47. A canister of cooking fuel (such as butane or propane) can be connected to fuel line 33.

A second basket that can be used with the apparatus 10 of the present invention is the basket 40 having a pair of handles 41, 42. Thus, a user can select either of the baskets 40 or 43 for cooking food articles. The basket 40 is for cooking a larger food item, such as a turkey 37. The basket 40 thus has two handles 41, 42, each handle 41, 42 nesting in a recess provided on a pot side panel 18 or 19. The side panel 18 thus provides recess or cut out 35. The side panel 19 provides recess or cut out 36. For the smaller baskets 43, recesses or cut outs 34 are provided in the front panel 17 of pot 14 as shown in FIG. 1.

The cabinet 13 can be comprised of a plurality of walls or panels. For example, the cabinet 13 can provide a front panel 50, side panels 51, 52 and a cabinet rear panel 53. The cabinet 13 has an upper edge 54 and a lower edge 55. The upper edge 54 surrounds open top 56. The lower edge surrounds open bottom 57.

Each of the cabinet panels 50-53 can be provided with one or more louvered cooler or cooler panels 58. The panels 58 are basically spaced away from each of the cabinet panels 50-53 using horizontal flanges 63. Louver openings 59 enable air to interchange with the interior portion of each of the louvered coolers 58. The rear panel 53 can be provided with a pair of such coolers 58, each having louver openings 59 with a vertical slot 60 there between. In this fashion, when the pot 14 is placed upon the frame 11, valve 26 travels downwardly through slot 60 and occupies a portion of the slot 60 when cooking.

FIGS. 12-16 show an alternate burner that can be used in place of the burner 45. In FIGS. 12-16, the burner element is designated generally by the numeral 29. Burner 29 has a pair of spaced apart burner elements 38, 39. Each burner element 38, 39 has outlet openings 78 for dispensing a gaseous fuel product (e.g. butane) that is to be ignited for generating a flame and heat. An influent flow line 66 conveys fuel from inlet fitting 73 and internally threaded opening 74 (receptive of a fuel conveying hose) to burner elements 38, 39. A joint or connection 70 joins influent flow line 66 to elbow fitting or section 67. In this fashion, fuel flows from a supply hose to inlet opening 74 and through influent pipe section 66 to burner elements 38, 39 and then is emitted via openings 78 to be ignited and form flames to heat. Air control 71 provides for adjustable air intake. Set screw 72 can affix the air intake at any selected opening size or volume. Mounting plate 68 has openings 69. Mounting plates 76 at closed end 75 of each burner element 38, 39 have openings 77. Fasteners 79 can be used to attach each mounting plate 68, 76 to cabinet 13.

PARTS LIST

The following is a list of parts and materials suitable for use in the present invention:

| Parts Number | Description |
| --- | --- |
| 10 | outdoor flying apparatus |
| 11 | frame |
| 12 | leg |
| 13 | cabinet |
| 14 | pot |
| 15 | lid |
| 16 | handle |
| 17 | front panel |
| 18 | side panel |
| 19 | side panel |
| 20 | handle |
| 21 | handle |
| 22 | rear panel |
| 23 | bottom panel |
| 24 | bottom panel |
| 25 | drain outlet |
| 26 | valve |
| 27 | hinge |
| 28 | interior |
| 29 | burner |
| 30 | lower rod |
| 31 | upper rod |
| 32 | opening |
| 33 | fuel line |
| 34 | cut out/recess |
| 35 | cut out/recess |
| 36 | cut out/recess |
| 37 | turkey |
| 38 | burner element |

-continued

| Parts Number | Description |
|---|---|
| 39 | burner element |
| 40 | basket |
| 41 | handle |
| 42 | handle |
| 43 | basket |
| 44 | handle |
| 45 | burner |
| 46 | burner element |
| 47 | burner element |
| 48 | pot support |
| 49 | hanger |
| 50 | cabinet front panel |
| 51 | cabinet side panel |
| 52 | cabinet side panel |
| 53 | cabinet rear panel |
| 54 | upper edge |
| 55 | lower edge |
| 56 | open top |
| 57 | open bottom |
| 58 | louvered cooler/cooler panel |
| 59 | louver opening |
| 60 | slot |
| 61 | flame |
| 62 | angle |
| 63 | flange |
| 64 | elbow/bend section |
| 65 | support surface |
| 66 | influent flow line |
| 67 | elbow |
| 68 | mounting plate |
| 69 | opening |
| 70 | joint/connection |
| 71 | air control |
| 72 | set screw |
| 73 | inlet end portion |
| 74 | internally threaded inlet opening |
| 75 | closed end |
| 76 | mounting plate |
| 77 | opening |
| 78 | opening |
| 79 | fastener |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An outdoor food frying apparatus comprising:
a frame which includes
a cabinet having
a cabinet interior
surrounded by multiple cabinet walls,
including
a front wall,
a rear wall and
side walls,
an open top and
an open bottom, the frame having a horizontal frame perimeter,
the frame including
a pot support located
below the open top and
next to the inside surfaces of the side walls,
the pot support supporting a pot having a pot interior;
a burner element
supported upon the frame
when the pot is not supported by the pot support, and within the cabinet interior at a burner element elevation,
the burner element including
a central pipe
that connects with a pair of spaced apart burner sections;
the pot
removably fitting the cabinet interior, and
being movable between cooking and removed positions and
being removable from the cabinet interior to the removed position by elevation of the pot vertically via the open top,
the pot resting upon the pot support in the cooking position,
the pot having a V shaped bottom comprised of
a pair of bottom panels that intersect to form an obtuse angle of less than 180 degrees and
a plurality of generally flat pot sidewalls;
wherein when in the cooking position,
one of the burner sections
directing a flame against one of the pair of bottom panels,
the other of the burner sections
directing a flame against the other of the pair of bottom panels; and wherein the pot having a drain opening, and a valve connected to the drain opening, further comprising a slot in one of the cabinet walls, wherein the slot extends to the open top, and the valve sliding in and relative to the slot when the pot is placed upon the frame in the cooking position.

2. The outdoor food frying apparatus of claim 1, wherein the combined flames of said one of the burner sections and said other of the burner sections are in contact with a majority of the V shaped bottom.

3. The outdoor food frying apparatus of claim 1 further comprising a basket that fits the pot interior, said basket having two handles on opposite sides of the basket, and each of the handles extending outside of the horizontal frame perimeter when the basket is located inside of the pot interior, and each pot side wall includes a recess that accepts one of the two handles, and the pot includes an open top located in a plane, and a lid rotatively connected to the pot and having open and closed states, and when in the closed state the lid is in contact with all sidewalls of the pot when the basket in the pot interior.

4. The outdoor food frying apparatus of claim 3, further comprising a pair of transverse rods located in the pot interior, including an upper transverse rod and a lower transverse rod, and hangers on the basket that enable the basket to be supported upon either of the upper or lower transverse rods, wherein the basket being in a draining position when being supported by the upper transverse rod and being in a cooking position when being supported by the lower transverse rod.

5. The outdoor food frying apparatus of claim 4 wherein the upper and lower transverse rods are positioned next to the rear cabinet wall.

6. The outdoor food frying apparatus of claim 1 further comprising a pair of baskets, each basket having a handle that extends in front of the cabinet.

7. The outdoor food frying apparatus of claim 6, further comprising a pair of transverse rods, including an upper transverse rod and a lower transverse rod both being located in the pot interior, and hangers on each of the baskets that enable either basket to be supported upon either of the upper or lower transverse rods wherein either basket being in a draining position when being supported by the upper transverse rod and being in a cooking position when being supported by the lower transverse rod.

8. The outdoor food frying apparatus of claim 7 wherein the upper and lower transverse rods are positioned next to the rear cabinet wall.

9. An outdoor food frying apparatus comprising:
a frame having
a horizontal cross-section,
the frame including
a cabinet having multiple cabinet walls, including
a front wall,
a rear wall and
side walls,
an open top and
an open bottom;
a burner element
supported upon the frame and
positioned next to the open bottom of the cabinet,
the burner element including
a pair of spaced apart burner sections;
a removable pot having a pot interior
a horizontal cross-section
similar to the horizontal cross-section of the frame
that removably fits the cabinet interior and
is removable via the open top of the frame,
the removable pot
resting upon a pot support in a cooking position,
the pot support being located between
the open top and the open bottom,
the pot having a V-shaped bottom comprised of
a pair of bottom panels
that intersect to form an obtuse angle of less than 180 degrees and
a plurality of generally flat pot sidewalls;
the burner being supported by the frame when the pot is removed via the open top, one of the burner sections
directing a flame against one of the pair of bottom panels,
the other of the burner sections
directing a flame against the other of the pair of bottom panels;
a plurality of baskets
that selectively fit the pot interior including
one basket that fits within the cabinet interior and
a second basket that is much smaller than the first basket; and the pot having a drain opening, and a valve connected to the drain opening, further comprising a slot in one of the cabinet walls, wherein the slot extends to the open top, and the valve sliding in and relative to the slot when the pot is placed upon the frame in the cooking position.

10. The outdoor food frying apparatus of claim 9, wherein the combined flames of said one of the burner sections and said other of the burner sections are in contact with a majority of the V shaped bottom.

11. The outdoor food frying apparatus of claim 9, further comprising a basket that fits the pot interior, said basket having two handles on opposite sides of the basket, and each of the handles extending outside of the horizontal cross section when the basket is located inside of the pot interior, and each pot side wall includes a recess that accepts one of the two handles, and the pot includes an open top located in a plane, and a lid rotatively connected to the pot and having open and closed states, and when in the closed state the lid is in contact with all sidewalls of the pot when the basket in the pot interior.

12. The outdoor food frying apparatus of claim 11, wherein the pot has a front wall has a pair of recesses that each accept a basket handle.

13. The outdoor food frying apparatus of claim 9 further comprising a pair of transverse rods located in the pot interior, including an upper transverse rod and a lower transverse rod, and hangers on the basket that enable the basket to be supported upon either the upper or lower transverse rods, wherein the basket being in a draining position when being supported by the upper transverse rod and being in a cooking position when being supported by the lower transverse rod.

14. The outdoor food frying apparatus of claim 13 wherein the upper and lower transverse rods are positioned next to the rear cabinet wall.

15. The outdoor food frying apparatus of claim 9 further comprising
a pair of transverse rods located in the pot interior,
including an upper transverse rod and a lower transverse rod, and
hangers on each of the plurality of baskets
that enable one or more of the plurality of baskets to be supported upon either of the upper or lower transverse rods,
wherein one or more of the plurality of baskets
being in a draining position when being supported by the upper transverse rod and
being in a cooking position when being supported by the lower transverse rod.

16. The outdoor food frying apparatus of claim 15 wherein the upper and lower transverse rods are positioned next to the rear cabinet wall.

17. An outdoor food frying apparatus comprising:
a frame which includes
a cabinet having
a cabinet interior
surrounded by multiple cabinet walls, including
a front wall,
a rear wall and side walls
with one or more inside surfaces,
an open top and
an open bottom,
the frame having
a horizontal frame perimeter, and
a pot support mounted on the one or more inside surfaces of said side walls;
a burner element
supported upon the frame and
within the cabinet interior
at a burner element elevation,
the burner element including
a pair of spaced apart burner sections;
a pot having a pot interior, the pot
removably fitting the cabinet interior and
is movable between cooking and removed positions,
the pot being removable
from the cabinet interior
to the removed position
by elevation of the pot vertically
via the open top,
the pot
resting upon the pot support
in the cooking position,
the pot having a V shaped bottom comprised of
a pair of bottom panels
that intersect to form an obtuse angle of less than 180 degrees,
a plurality of generally flat pot sidewalls, and
an interior for holding cooking fluid;
wherein in said cooking position,
the pot is spaced above the burner elements
which are not positioned within the pot interior,
each burner element being spaced below the V shaped bottom,
one of the burner elements
directing a flame against one of the pair of bottom panels,
the other of the burner elements
directing a flame against the other of the pair of bottom panels; and the pot having a drain opening, and a valve connected to the drain opening, further comprising a slot in one of the cabinet walls, wherein the slot extends to the open top, and the valve sliding in and relative to the slot when the pot is placed upon the frame in the cooking position.

18. The outdoor food frying apparatus of claim 17, wherein the combined flames of said one of the burner sections and said other of the burner sections are in contact with a majority of the V shaped bottom.

19. The outdoor food frying apparatus of claim 17, further comprising a basket that fits the pot interior, the basket having two handles on opposite sides of the basket, and each of the handles extending outside of the horizontal frame perimeter when the basket is located inside of the pot interior.

20. The outdoor food frying apparatus of claim 19 wherein the pot has multiple side walls and each pot side wall has a recess that accepts a pot handle.

21. The outdoor food frying apparatus of claim 19 further comprising a pair of transverse rods located in the pot interior, including an upper transverse rod and a lower transverse rod, and hangers on the basket that enable the basket to be supported upon either of the upper or lower transverse rods, wherein the basket being in a draining position when being supported by the upper transverse rod and being in a cooking position when being supported by the lower transverse rod.

22. The outdoor food frying apparatus of claim 21 wherein the upper and lower transverse rods are positioned next to the rear cabinet wall.

23. The outdoor food frying apparatus of claim 17 further comprising a pair of baskets, each basket having a handle that extends in front of the cabinet.

24. The outdoor food frying apparatus of claim 23, wherein the pot has a pot front wall and the pot front wall has a pair of recesses that each accept a pot handle.

25. The outdoor food frying apparatus of claim 23 further comprising
a pair of transverse rods located in the pot interior,
including an upper transverse rod and a lower transverse rod,
and
hangers on each of the pair of baskets that
enable one or both of the pair of baskets to be supported upon
either of the upper or lower transverse rods,
wherein one or both of the pair of baskets
being in a draining position when being supported by the upper transverse rod and
being in a cooking position when being supported by the lower transverse rod.

26. The outdoor food frying apparatus of claim 25 wherein the upper and lower transverse rods are positioned next to the rear cabinet wall.

* * * * *